Figure 1:
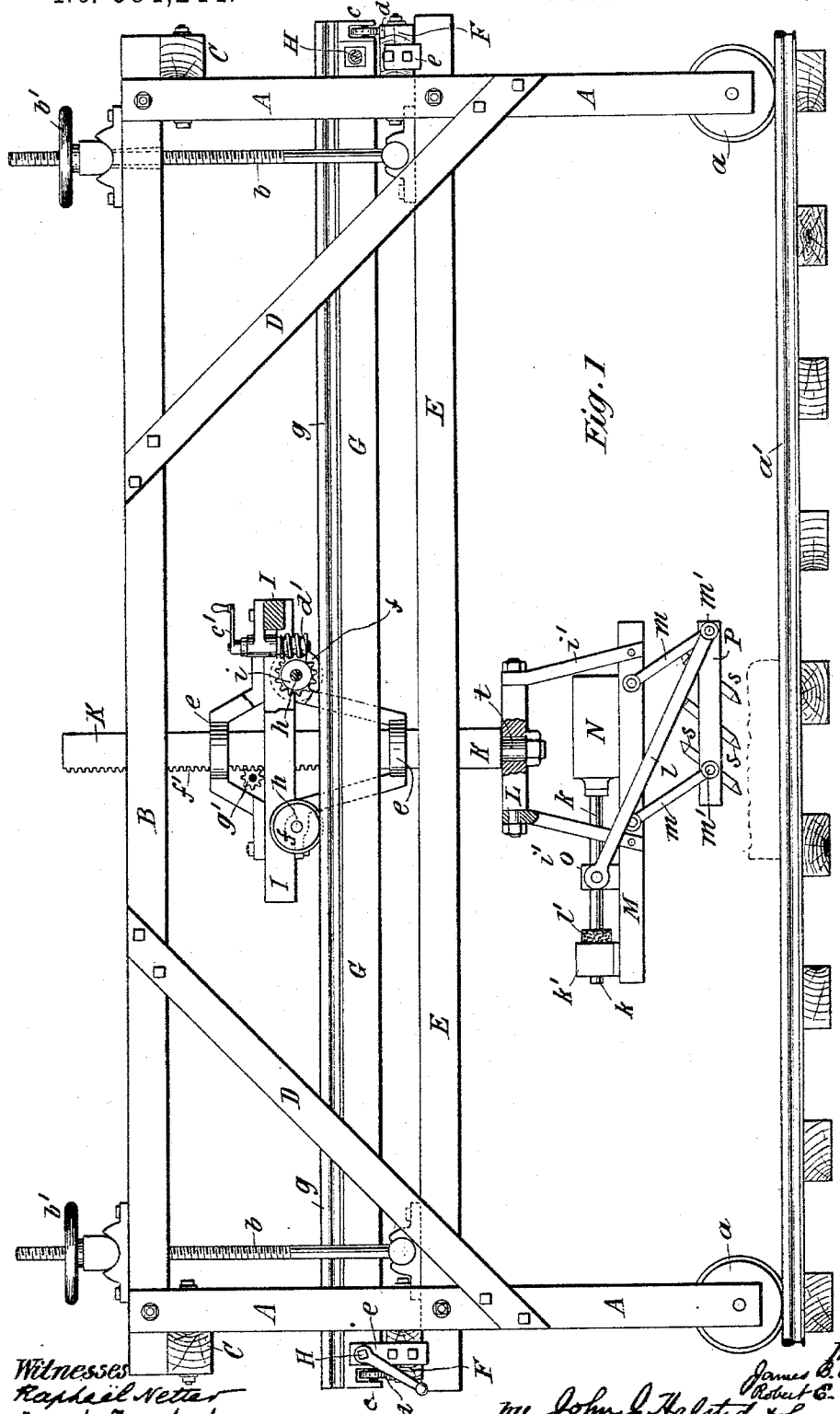

(No Model.) 3 Sheets—Sheet 1.

J. B. SEAGER & R. E. MILLER.
MACHINE FOR SCABBLING STONE.

No. 584,244. Patented June 8, 1897.

Witnesses
Raphael Netter
Frank ...

Inventors
James B. Seager
Robert E. Miller
by John J. Halsted & Son their Att'ys (No Model.) 3 Sheets—Sheet 2.
J. B. SEAGER & R. E. MILLER.
MACHINE FOR SCABBLING STONE.
No. 584,244. Patented June 8, 1897.
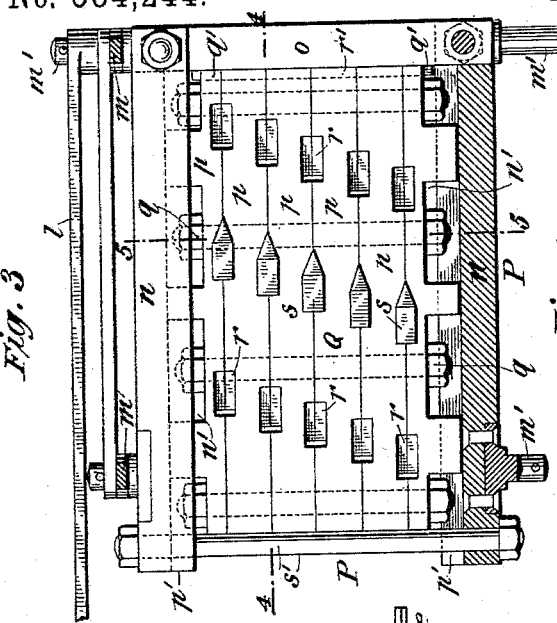
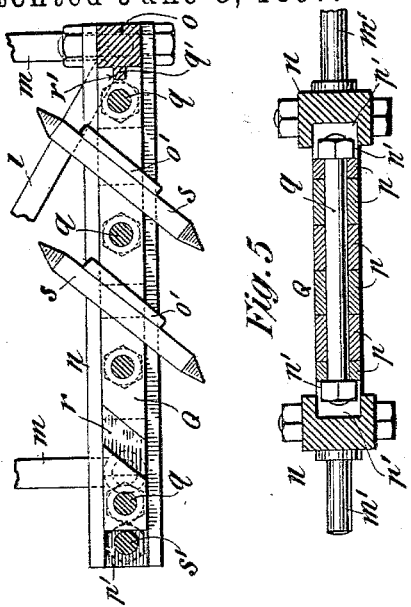
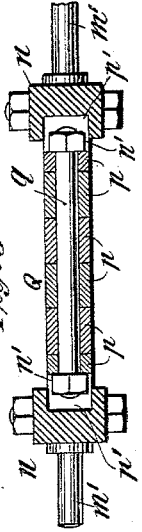
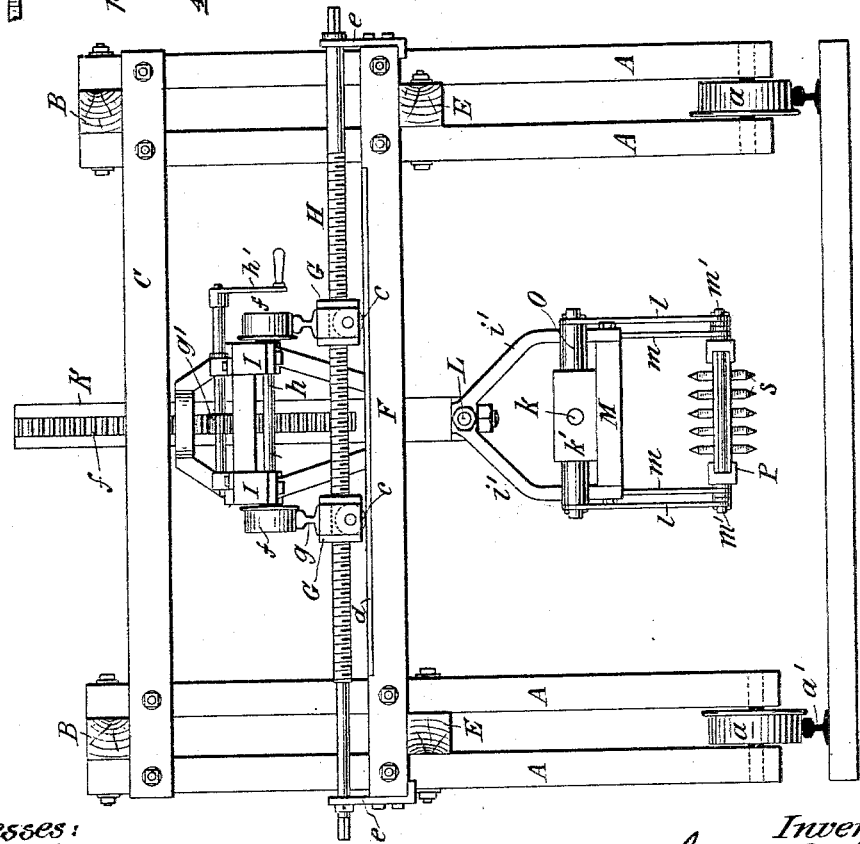
Witnesses:
Raphael Netter
Frank Tunholm
Inventors
James B. Seager
Robert E. Miller
by John J. Halsted & Son
their Attorney.

(No Model.) 3 Sheets—Sheet 3.
J. B. SEAGER & R. E. MILLER.
MACHINE FOR SCABBLING STONE.
No. 584,244. Patented June 8, 1897.
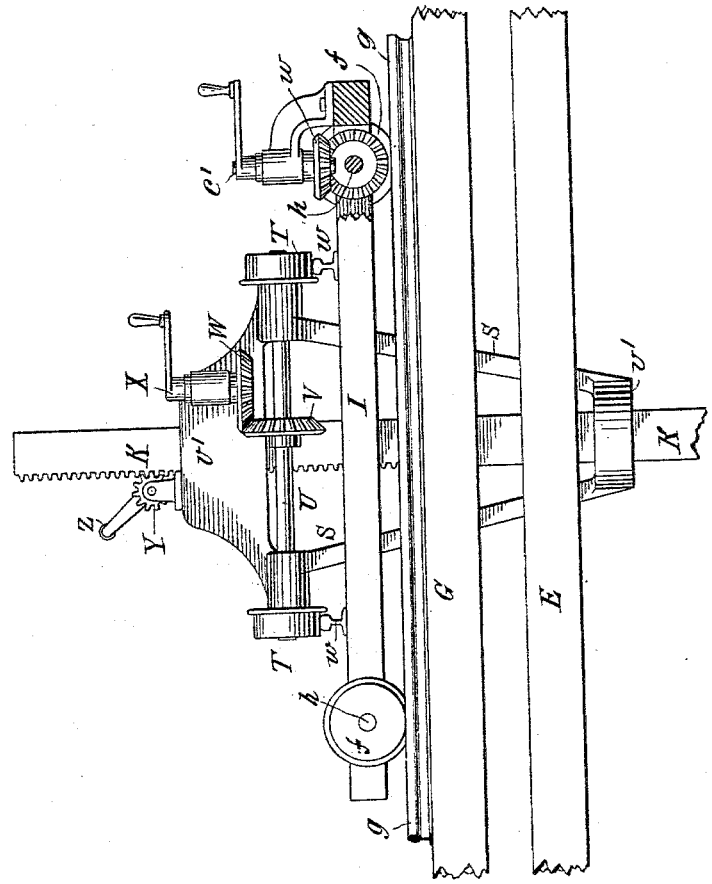
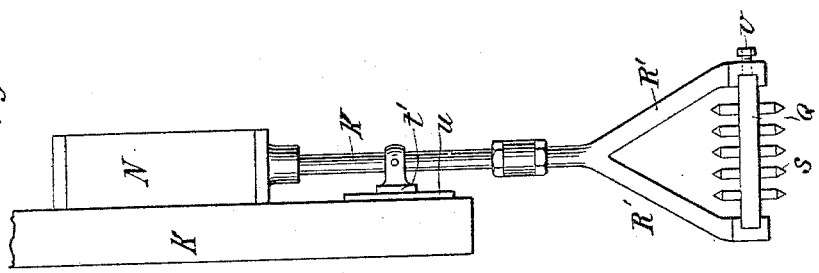

UNITED STATES PATENT OFFICE.

JAMES B. SEAGER, OF CHICAGO, ILLINOIS, AND ROBERT E. MILLER, OF STINESVILLE, INDIANA.

MACHINE FOR SCABBLING STONE.

SPECIFICATION forming part of Letters Patent No. 584,244, dated June 8, 1897.

Application filed April 24, 1895. Renewed February 6, 1897. Serial No. 622,359. (No model.)

*To all whom it may concern:*

Be it known that we, JAMES B. SEAGER, of Chicago, Illinois, and ROBERT E. MILLER, of Stinesville, Indiana, have invented a new and useful Machine for Scabbling Stone; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of our invention is to provide a machine for "scabbling" stone or for removing the irregularities from the surface of the stone after the latter has been quarried.

Our invention consists generally of a reciprocating frame holding two or more picks for picking off or removing the irregularities from the surface of the stone, said holder being so suspended as to be capable of being placed at any angle.

Our invention also consists in providing the pick-frame with supports that will have means in connection therewith for giving said frame both a longitudinal and lateral feed.

In the accompanying drawings, Figure 1 illustrates a side elevation of our improved scabbling-machine. Fig. 2 is an end view of the same. Fig. 3 is a plan enlarged of pick-frame, partly in section, including the pick-rack, picks, and rack-holder. Fig. 4 is a longitudinal section through the line 4 4 of Fig. 3. Fig. 5 is a transverse section through the line 5 5 of Fig. 3. Fig. 6 shows upon an enlarged scale the slight difference of the construction for giving a direct stroke to the pick-frame. Fig. 7 shows a modification of the lateral feed mechanism.

Similar letters represent like parts in all the figures.

A A are the legs of the supporting-frame of the entire machine, on the lower ends of which are journaled rollers $a$, which ride on rails $a'$ to enable the machine to run over the stones to be scabbled. B B are the longitudinal parallel beams, and C C the transverse parallel beams connecting the legs A A at the top, and D D are braces connecting the legs A A and beams B B.

E E are two longitudinal beams situated below the beams C and parallel with the beams B and inclosed and guided by the legs A A. Outside of said legs the beams E E are connected by two cross-beams F F. Said beams E E and F F constitute an adjustable tilting frame or table, which is supported, tilted, and adjusted vertically and obliquely by means of two screws $b\ b$, passing through slots in the beams B at opposite ends, respectively, of the main frame, the lower ends of which screws are attached to the beams E E by universal joints. The tilting of the frame E F or the raising or lowering of either end of the same will be effected by the raising or lowering of the appropriate screw $b$ by means of its hand-wheel $b'$, through which the screw passes, said wheel being supported on beam B.

G G is a frame inclosed within the legs A A and provided with rollers $c\ c$, which rest upon and are adapted to ride on rails $d\ d$, which are secured to the upper surfaces of the beams F F, respectively.

H H are screws supported in brackets $e\ e$, which are secured to the outer ends of the beams F, said screws passing through the threaded bearings in the frame G, and by means of which said frame may be laterally adjusted.

I is a carriage provided with rollers $f\ f$, which are supported and adapted to ride upon rails $g\ g$, which are secured to the upper surfaces of the two longitudinal parallel beams, respectively, of the frame G. One of the axles $h$, connecting two opposite rollers $f\ f$, is provided with a gear $i$. A crank-shaft $c'$ is journaled upon a carriage I and is provided with a worm $d'$, which engages with the gear $i$, said crank-shaft, gear, and worm serving to rotate the axle $h$ and its rollers $f$ and to propel the carriage I.

K is a bar or post passing vertically through the carriage I and guided and held in place by fixed collars or bearings $e'$, extending above and below said carriage. One side of the post K is provided with a rack $f'$, and a pinion $g'$, supported in bearings on the carriage I, engages with said rack and serves to hold the post K in any desired position as well as to raise and lower the same. A crank $h'$, secured to the shaft of the pinion $g'$, serves to rotate said pinion.

L is a cross-bar which is pivotally hung upon the lower end of the post K.

M is a frame pivotally suspended by suitable bearing-arms $i'$ $i'$ to the ends of the cross-bar L, and said frame M supports a reciprocating engine N. The reciprocating rod $k$ of the engine N passes through a hole in a block $k'$ at the end of the frame M, opposite to the engine.

O is the cross-head secured to the rod $k$ and to which is pivoted the connecting-rods $l$ for transmitting the power to the pick-frame P. Said frame is pivotally suspended to the engine-frame M by parallel links $m$ $m$, and the lower ends of the connecting-rods $l$ are pivoted to the frame P near its rear end, so that said frame will be made to swing back and forth in unison with the reciprocations of the rod $k$. A rubber or other yielding buffer $l'$ is secured to the inner surface of the block $k$ to break the blow in case the cross-head should accidentally extend too far on its outward stroke. The frame P is composed of two parallel longitudinal sides $n$ $n$ and a transverse end $o$, connecting said sides. The journal-bearings $m'$ $m'$ of the frame P for the supporting-links $m$ $m$ are near the ends of the two sides $n$ $n$, respectively.

Q is the pick-rack, which is composed of a number of bars $p$, removably and adjustably secured together side by side by transverse screw-bolts $q$, the heads of said bolts resting in recesses $n'$ of the two outer bars. Extending through the rack Q are a series of oblique holes $r$, made at the junction of the adjoining bars $p$, so that each of said bars will have an oblique slot meeting and conforming with its complementary slot on the adjoining bar. These holes $r$ (which are preferably at an angle of forty-five degrees) are sockets for the picks $s$, said picks being simply pointed or chisel-ended steel bars. These picks are removably attached to the rack Q by being inserted through the holes $r$, wedges $o'$ serving to keep said picks firmly in position. The bars being held together by screw-bolts can be adjusted nearer together or farther apart by means of the bolt-nuts to tighten or loosen the picks or to adapt the frame for picks of different sizes. The holes $r$ are also preferably arranged in oblique rows, as shown in Fig. 3, in order that in the process of scabbling the greatest surface can be operated upon at one time. The rack Q is adapted to be slid into the frame P, said frame having longitudinal grooves $p'$ in its sides $n$ for this purpose. When so slid into place, the rack Q is firmly secured, by means of a tenon $q'$, in the end $o$, fitting into a mortise $r'$ in the end of the rack Q, and a removable cross-bolt $s'$, connecting the ends of the bars $n$, opposite the end $o$, said bolt being beyond the end of the rack Q. It will thus be seen that the rack Q can be readily removed from the frame P by first removing the bolt $s'$ and then sliding the rack Q out from said frame. By making the rack Q of bars (preferably wrought) it is much stronger than if it were made in one piece, and at the same time it provides a greater adjustability in relation to the picks and the frame P.

The pickers $s$ when properly secured in their frame P all remain, relatively to each other, fixed in said frame, and their position relatively to the stone to be scabbled is effected by changing the position of bar L and consequently of frame M with it or by changing the position of frame M by means of the arms $i'$ $i'$ and the nuts which, as shown in Fig. 1, fasten these arms to bar L. These positions are not produced by shifting any one or more picks separately. One adjustment serves for all the picks in frame P.

The operation is as follows: The machine is moved along on its rollers $a$ $a$ until the pick-frame P is over the stone to be scabbled. The tilting frame E F is then adjusted by the screws $b$ until the frame P is parallel with the upper surface of the stone. The column or post K is then lowered by the pinion $g'$ until the picks $s$ in the rack Q rest upon the stone. The engine N is then put into operation and the frame P and picks $s$ are swung forward and backward by the rod $k$ and connecting-rods $i$, picking and scabbling the stone, and the machine is fed forward by the crank-shaft $c'$, as hereinbefore described. When the length of the stone has been scabbled, the frames M and P are reversed by turning around the bar L on its bearing $t$, the carriage I, post K, and depending mechanism are moved by the screws H H across the swath which has just been scabbled. The above operation is continued until the entire top surface of the stone has been scabbled. By turning the stone so that each side may successively or at will become uppermost every side may be scabbled as above described; but if it be desired to scabble the sides of the stone as it lay the post K and frames M and P are first moved a little beyond the stone, and said frames are then swung by the arms $i'$ $i'$ on the bar L, so that the frame P is parallel with the side of the stone to be scabbled with the ends of the picks $s$ resting against said side. The engine N is then started and the pick-frame P and picks will reciprocate up and down against the side of the stone, the feeding being done by raising and lowering the column K by means of the pinion $g'$ instead of by the crank-shaft $c'$, as before. The feeding to cut a new swath is done as before described by means of the screws H H.

The pivoted bar L and the pivoted arms $i'$ $i'$, with the nuts for holding said bar and arms in place, will permit the pick-frame to be so adjusted as to scabble or dress the surface of the stone when at any angle.

We have shown in Fig. 6 a slight modification of the mechanism by which a direct percussion movement may be given to the picks and its rack.

The reciprocating engine N is secured directly to and against one side of the post K, and a slide $f'$, secured to the reciprocating rod $k$, is inclosed and adapted to move in a guide $u$, secured to the post K below the engine N, this construction being to prevent the rotation of the rod $k$ and the depending picks. In place of said slide and guide the rod $k$ will be prevented from turning if made angular in cross-section and passing through a similar eye or guiding-collar secured to the post K below the engine N.

Extending from the lower end of the post K are depending arms R' R', having lateral notches or grooves $u'$ in their inner sides, in which notches or grooves the pick-rack Q is slid and held. A set-screw $v$, passing through one of the arms R' into or against the edge of the rack Q, serves to securely hold the same in the arms R' R'.

In the above-described construction the rod $k$ will reciprocate vertically, giving a percussion up-and-down movement of the picks upon the stone to be scabbled.

In other respects the operation of the machine will be the same as hereinbefore described with relation to the other figures.

In the modification shown in Fig. 7 the post K and its depending parts are hung upon a traveler S, said post being guided in its feed by two collars or fixed sleeves $v'$ $v'$ on said traveler. T T are rollers mounted upon the traveler S and which rest and ride upon rails $w$ $w$, secured to the top of the carriage I. Secured to one of the axles U of the rollers T is a bevel-gear V, and another bevel-gear W engages with said gear V. The gear W is mounted upon a crank-shaft X, which is journaled upon the traveler S. The lateral feed or movement of the pick-rack is given by rotating the crank-shaft X and its gear W, this causing the gear V, axle U, and rollers T to rotate and to move the traveler S along laterally on the carriage I. In this construction instead of the pinion $g'$ for feeding the post K being mounted upon the carriage I a similar pinion Y is mounted upon the carrier S and is capable of rotation by means of its crank Z. Instead of the longitudinal feed being given by a worm $d'$, as shown in Fig. 1, said feed is given by a bevel-gear $w'$ on the crank-shaft $c'$, engaging with another bevel-gear $x'$ on the axle $h$.

What we claim as new, and desire to secure by Letters Patent, is—

1. A machine for scabbling stone, having a reciprocating swing pick-frame provided with a set of picks supported therein, said frame being suspended and adapted to be reversed and also to be adjusted to any desired angle, all substantially as set forth.

2. In combination with a vertically-adjustable post passing through the carriage, an engine-frame hung therefrom and carrying a pick-frame having a set of picks and adapted to be swung, and rods connecting this pick-frame to the reciprocating rod or piston of the engine.

3. In a stone-scabbling machine, the combination of a reciprocating engine hung on a frame suspended from a vertical post and adapted to be turned around thereon, a swing pick-frame carrying a set or system of picks, and rods connecting such frame to and actuated by said engine.

4. In a stone-scabbling machine, the combination of a suspended reciprocating engine, a pick-holder with its supported picks suspended by swinging links from the frame of said engine, and said holder and the reciprocating rod of said engine being connected by a connecting-rod, all as and for the purposes set forth.

5. A pivotally-suspended horizontal engine, combined with a swinging pick frame or holder carrying rows of picks and hung on the frame of such engine, the reciprocating piston-rod of said engine being connected with a rod pivoted to the end of said pick-frame, all as and for the purposes set forth.

6. In combination with a frame supporting an adjustable tipping table, means for adjusting said table vertically and obliquely, a laterally-adjustable track-frame supported on said table, a longitudinally-adjustable carriage supported on the track-frame and adapted to ride upon the rails of the same, a reciprocating engine, and the vertical post from which the reciprocating engine is suspended and on which it may be swung around and reversed in position, all as set forth.

7. In a stone-scabbling machine, the combination with a suspended reciprocating engine, of a swing frame hung on vibrating links and actuated by said engine, and a set or system of picks in a rack in said frame, and means for removing said rack from its frame.

8. In a stone-scabbling machine, the combination of the main frame its wheels and track, the supporting-beams for the mechanism, the suspended reciprocating engine, the tilting table and its adjusting-screws $b$, having at their lower ends ball-joints from which such table is suspended above the said engine and the pick-holder, all substantially as set forth.

9. In a stone-scabbling machine, in combination, the supporting-frame for the mechanism, the suspended reciprocating engine, the tilting table above said engine, means substantially as set forth for obliquely adjusting the same, the frame G and its rollers supported on rails upon beams F of said table, and the screws H, journaled in brackets $e$, at the outer ends of beams F, and extending through the frame G for laterally moving and adjusting said frame, all substantially as set forth.

JAMES B. SEAGER.
ROBERT E. MILLER.

Witnesses:
CHARLES ASIALA,
GEO. T. HYDE.